(No Model.)
6 Sheets—Sheet 1.

D. R. BUCHANAN.
APPARATUS FOR ENAMELING DIALS.

No. 503,525. Patented Aug. 15, 1893.

Witnesses:
Jas. E. Hutchinson.
Henry C. Hazard.

Inventor.
D. R. Buchanan, by
Dindle & Russell, his Attys (No Model.) 6 Sheets—Sheet 4.
D. R. BUCHANAN.
APPARATUS FOR ENAMELING DIALS.
No. 503,525. Patented Aug. 15, 1893.

Witnesses:
Jas. E. Hutchinson.
Henry C. Hazard.

Inventor:
D. R. Buchanan, by
Crindle and Russell, his Attys.

(No Model.) 6 Sheets—Sheet 6.

D. R. BUCHANAN.
APPARATUS FOR ENAMELING DIALS.

No. 503,525. Patented Aug. 15, 1893.

Witnesses:
Jas. E. Hutchinson
Henry C. Hazard

Inventor
D. R. Buchanan, by
Crindle and Russell, his Attys

UNITED STATES PATENT OFFICE.

DAVID R. BUCHANAN, OF ELGIN, ASSIGNOR TO THE ELGIN NATIONAL WATCH COMPANY, OF CHICAGO, ILLINOIS.

APPARATUS FOR ENAMELING DIALS.

SPECIFICATION forming part of Letters Patent No. 503,525, dated August 15, 1893.

Application filed July 19, 1890. Serial No. 359,320. (No model.)

*To all whom it may concern:*

Be it known that I, DAVID R. BUCHANAN, of Elgin, in the county of Kane, and in the State of Illinois, have invented certain new and useful Improvements in Apparatus for Enameling Dials; and I do hereby declare that the following is a full, clear, and exact description thereof, reference being had to the accompanying drawings, in which—

Figure 1:
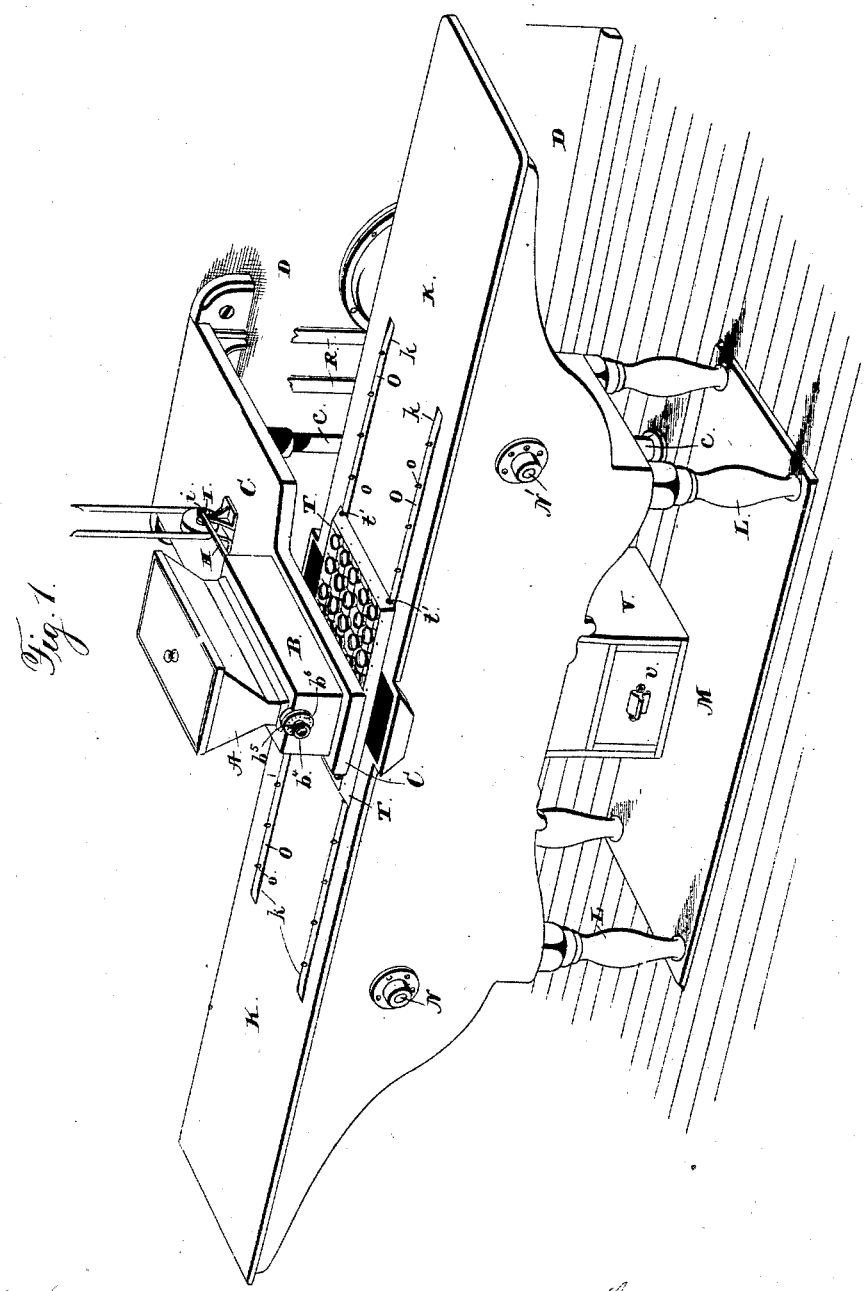
Figure 2:
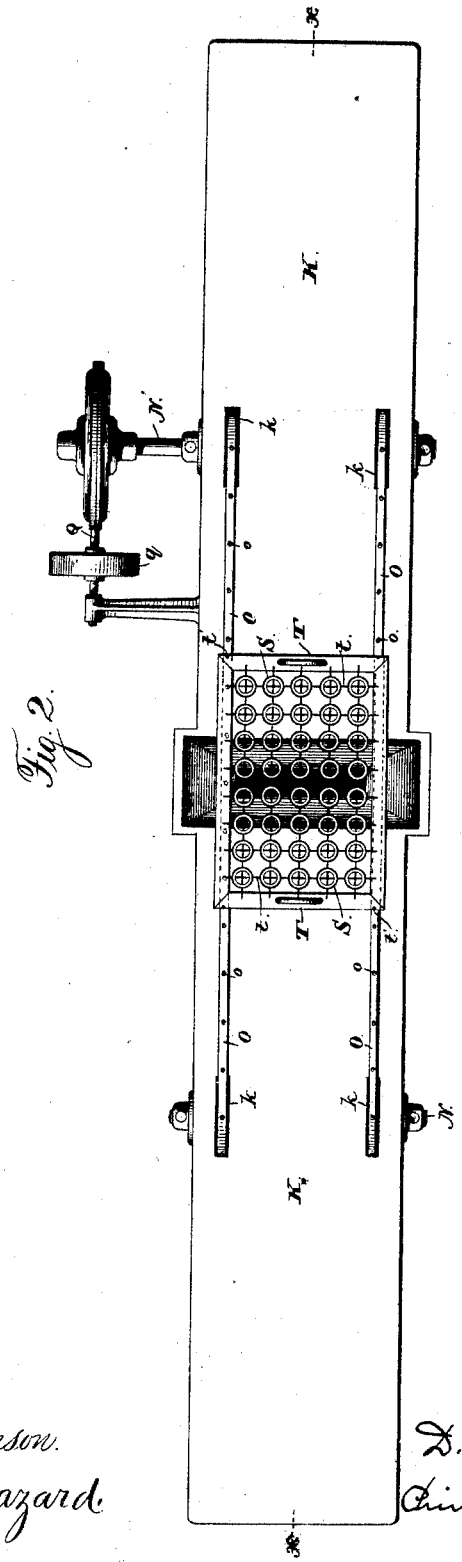
Figure 3:
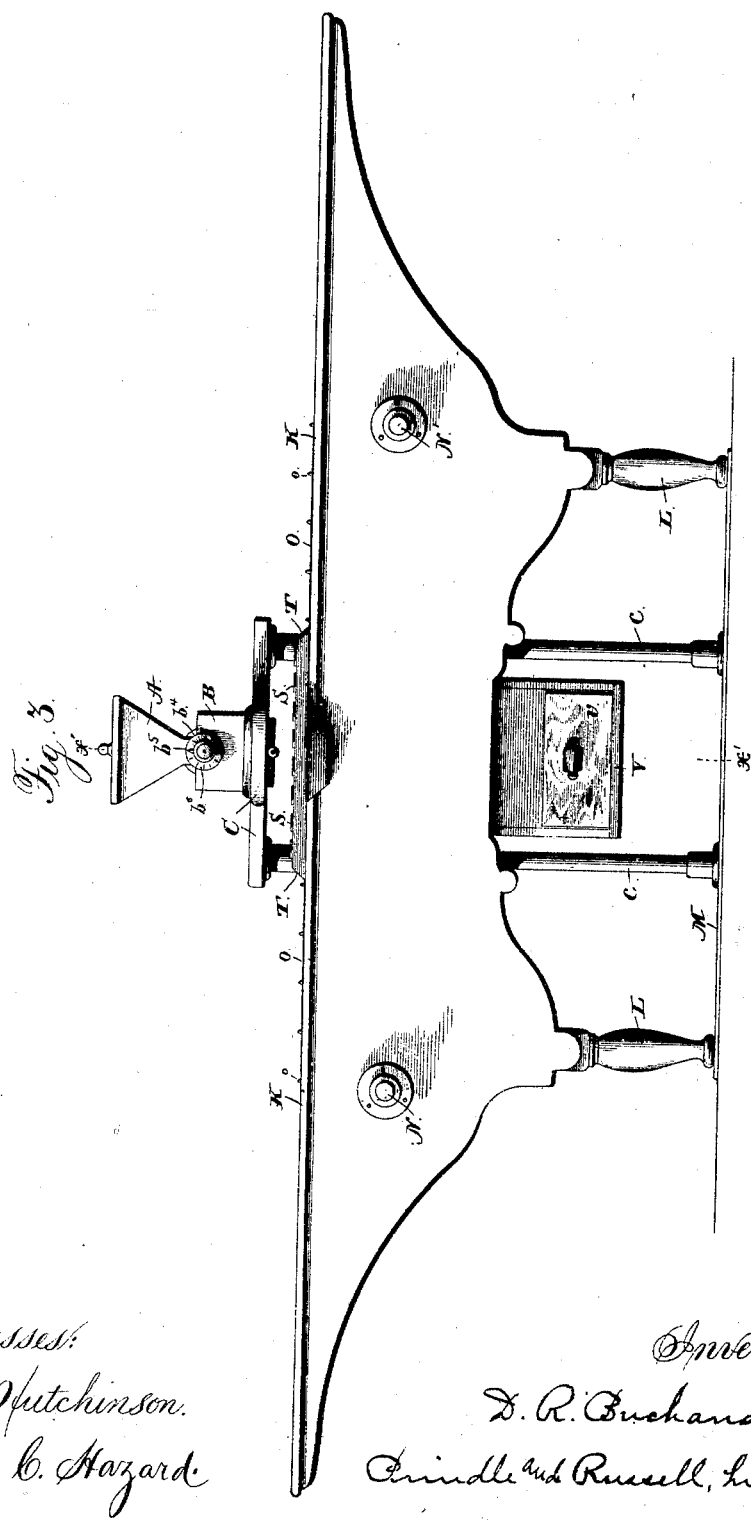
Figure 4:
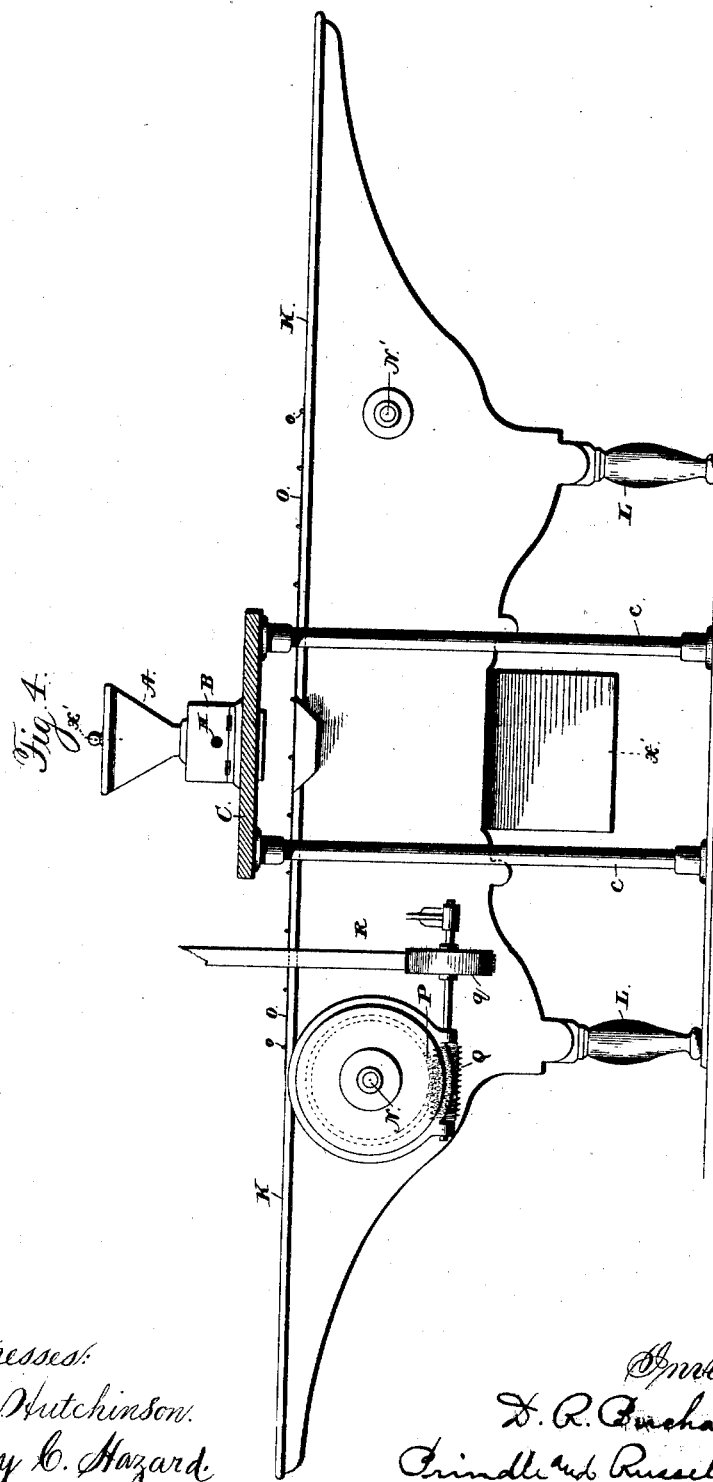
Figure 5:
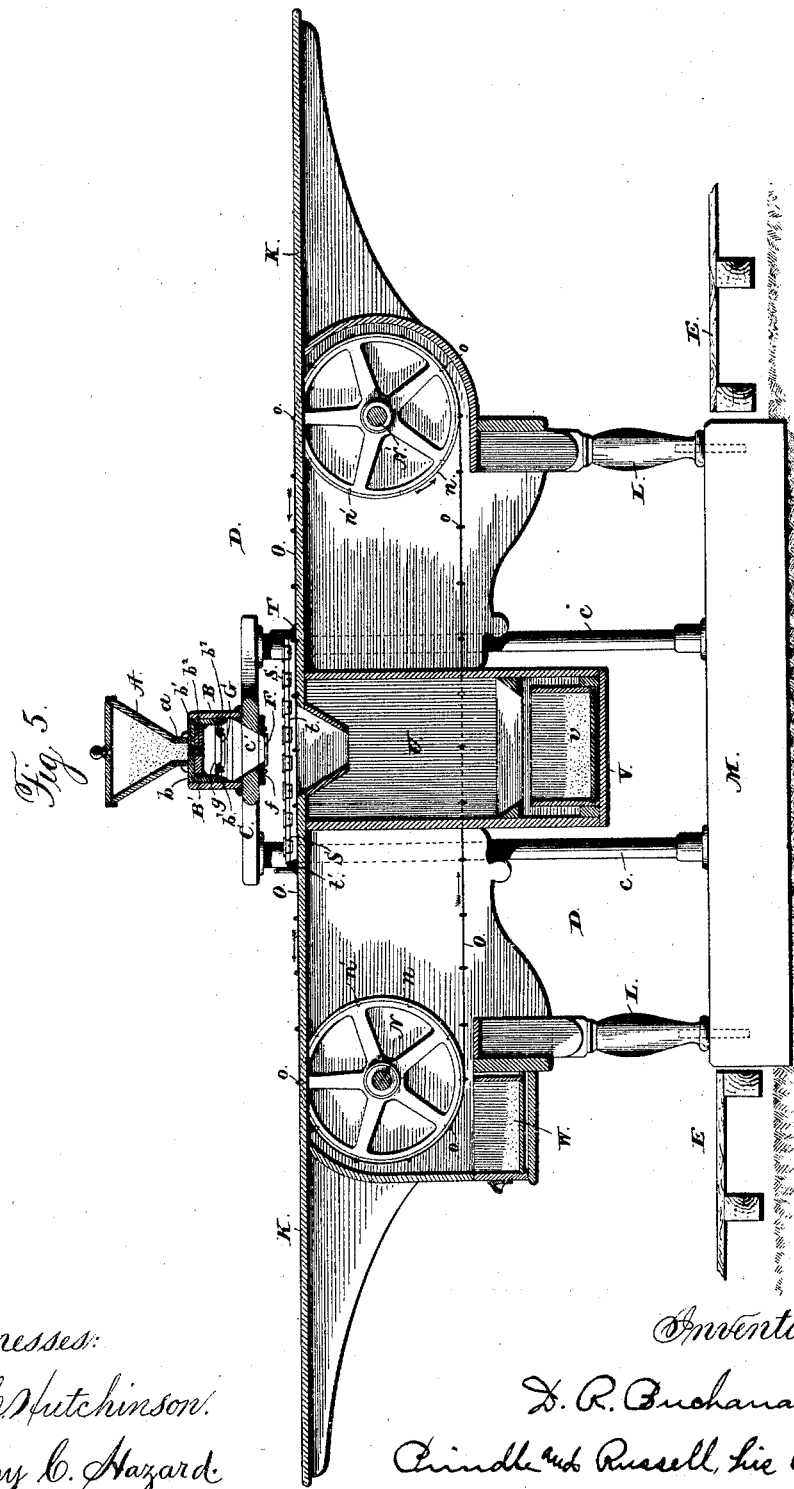
Figure 6:
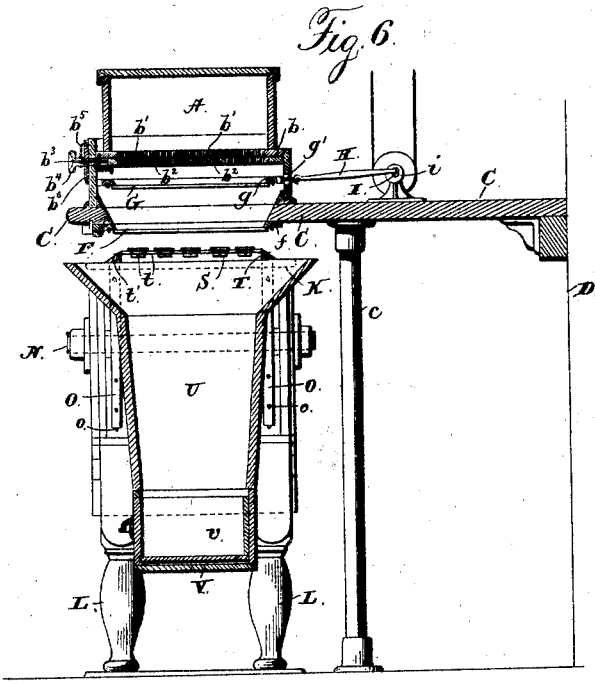
Figure 7:
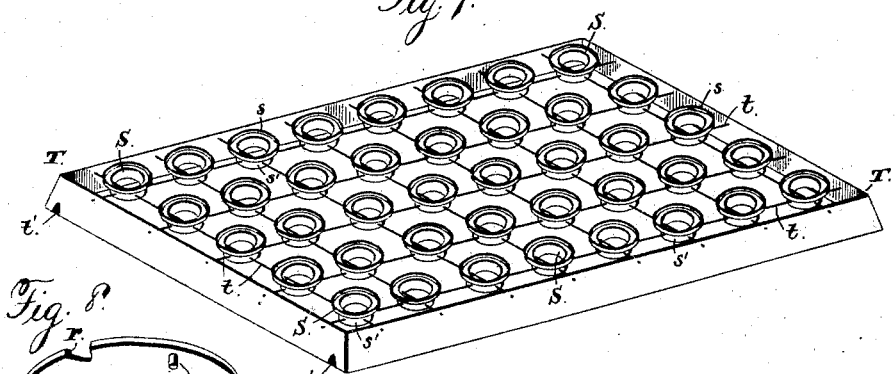
Figure 8:
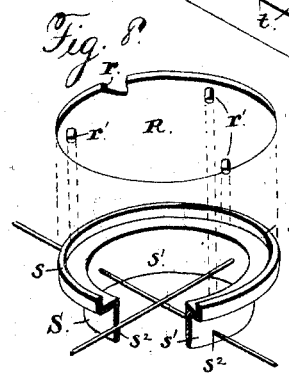
Figure 9:
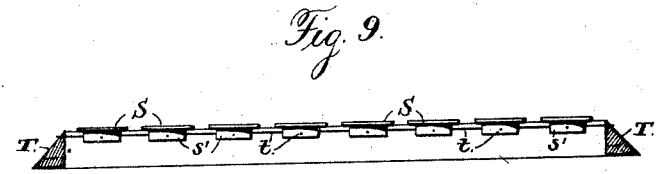

Figure 1 is a perspective view of my apparatus as arranged for use. Fig. 2 is a plan view of the upper side of the same. Figs. 3 and 4 are, respectively, front and rear elevations of said apparatus. Fig. 5 is a section of the same upon line $x\ x$ of Fig. 2. Fig. 6 is a section upon line $x'\ x'$ of Figs. 3 and 4. Fig. 7 is an enlarged perspective view of one of the trays employed for supporting dials while passing beneath the enamel sifting mechanism. Fig. 8 is a like view of a dial holding ring separated from its tray, and Fig. 9 is a section of said tray upon a line passing through a row of said dial rings.

Letters of like name and kind refer to like parts in each of the figures.

In the manufacture of watch dials it has heretofore been the custom to apply the enamel to the metallic base, by hand, in the form of a paste, and to then place the dial within a furnace and fuse such enamel.

The object of my invention is to enable enamel to be more evenly applied to the base than has heretofore been practicable and by the employment of mechanical means for hand work, to secure, uniformity in the thickness of the coating and to materially lessen the cost of the enameling operation, to which end my said invention consists in the methods used and the apparatus employed, substantially as and for the purpose hereinafter specified.

In the carrying of my invention into practice, I employ for the reception of powdered enamel a reservoir A which in plan view is oblong in shape and in cross section has a V or hopper shape, so that its lower open end $a$ has about one sixth the width of its upper end. The reservoir A rests upon and is supported by a rectangular base or housing B which, in turn, rests upon and is secured to a horizontal table C that, preferably, has one end secured upon a side wall D and near its longitudinal center is supported by means of two posts $c$ and $c$ which extend between the same and the floor E. The housing B has about three times the width of and is somewhat longer than the lower end of the reservoir A and at the transverse center of the opening $a$ of the latter is provided within its top $b$ with a row, or with parallel rows, of vertical openings $b'\ b'$, &c., which are, preferably, round and have uniform size and relative arrangement. Directly beneath the said top $b$, a slide B' is fitted within the interior of said housing and while filling the space therein laterally, has such length as to enable it to have a longitudinal motion equal to or somewhat greater than the diameter of one of the openings $b'$. Said slide is provided with openings $b^2, b^2$, &c., which correspond in number, size, shape and relative position to the like features of said openings $b', b'$, &c., and, by a longitudinal adjustment of the slide may be caused to coincide with the latter, to come opposite to the solid portions of the top $b$, or to occupy any desired position between such extremes.

The slide B' operates as a valve to permit and regulate the passage of powdered enamel from the reservoir A, or to entirely prevent such passage, when desired, and is adjusted to and secured in position by means of a screw $b^3$ which has one end secured within one end of said slide and its opposite, threaded end projecting through the contiguous end of the housing B, where it receives a nut $b^4$. As thus arranged, by turning said nut in one direction, said screw, and with it said slide, will be drawn outward, while by turning said nut in an opposite direction, said slide will be permitted to be moved inward by means of a spring that is caused to exert a rearward pressure upon the same. For convenience of adjustment, said nut $b^4$ is provided with a pointer $b^5$ which passes over an annular scale $b^6$ that is formed upon the contiguous end of said housing or upon a plate attached thereto. While the mechanism shown is preferably employed for moving and adjusting said slide, any other construction desired may be used for such purpose.

The table C, within the space inclosed by the housing B, is cut away upon downwardly and inwardly inclined lines and the opening $c'$ thus formed is inclosed upon its lower side by means of a sieve F that is, preferably, made from silk bolting-cloth and secured upon a detachable frame $f$. Between said sieve F and the slide B' is a second, finer sieve G which may, also, be made from silk bolting-cloth and is secured upon a frame $g$ that has its side edges contained within or resting upon suitable guides $b^7$ and $b^7$ so as to be capable of a longitudinally reciprocating motion within said housing. From one end of said frame a rod $g'$ projects horizontally outward through an opening in the end of said housing and has pivoted thereto one end of a rod H, the opposite end of which is in turn pivoted upon a crank $i$, that revolves with a shaft I and by such rotation gives to said frame $g$ and its sieve G a reciprocating motion—preferably about one thousand vibrations per minute. If now the reservoir or hopper is filled with powdered enamel, the slide adjusted so as to permit some of the contents to pass downward and the upper sieve caused to reciprocate, the result will be that the enamel will be evenly and in uniform quantity sifted upon the lower, coarser sieve and through the latter will fall with perfect uniformity and regularity upon anything placed below.

For the purpose of properly supporting dial-bases and moving the same beneath the falling enamel powder, I employ the following described mechanism, viz: A table K, having a suitable length, is supported upon four legs L, L, &c., which legs rest upon and are secured to a pier M that extends downward into the ground a sufficient distance to render it perfectly stable and is free from contact with the floor or other part of the building so that any vibration of the latter occasioned by machinery or from other causes, will not be communicated to said table. Journaled transversely between the center and each end of the table K is a horizontal shaft N and N', each of which carries two pulleys $n$ and $n$ that are separated a distance suited to the size of the frame or tray to be used and are each provided with a series of equi-distant recesses $n'$ and $n'$ which have each the general shape of the pointed end of an egg. Said wheels have their upper portions contained within corresponding openings $k$ and $k$ in the table K and are so arranged that their peripheries are substantially in a line with the upper surface of the same. An endless metal band O passes around each corresponding pair of wheels and is provided at equidistant points with centrally located studs $o$, $o$, &c., which project to equal distances from each side of the same and upon the inner side are adapted to engage with said recesses $n'$ and $n'$ so that when one of said shafts is rotated, the other shafts and its wheels will be caused to revolve and said bands will be moved longitudinally. One of the shafts $h'$ extends laterally outward and upon its end has secured a worm-wheel P which is engaged by a worm Q that is journaled beneath the same—at a right angle to said shaft—and is provided with a pulley $q$ through which, by means of a belt R from a source of power, motion may be imparted to said worm and through the latter, the worm wheel and its shaft and the pulleys $n$ and $n$, to the bands or carriers O and O, which motion will be uniform and free from variation. The usual dial-base R is a thin copper disk having its edge turned upward to form a slight peripheral flange $r$ and upon its lower side or back has secured three studs or feet $r'$, $r'$, &c. For its support I employ an annular ring S which has its outer edge turned upward to form a peripheral flange $s$ and its inner edge turned downward to form at such point a second flange $s'$. The circle of said flange $s$ has such diameter as to permit the feet of a dial to pass freely inside of the same, so that when a dial-base is thus placed, it will be securely held in position within said ring or holder so long as the latter maintains a horizontal position, and may be readily inserted in or removed from place. A number of the holders S and S—from forty upward according to the size of dial to be enameled—are arranged in parallel, intersecting rows within a rectangular frame T and are secured in place therein by means of rods $t$ and $t$ that extend from side to side of said frame and through corresponding openings $s^2$ and $s^2$ that are formed in the flange $s'$, the arrangement being such that each holder is supported and held in place by means of two of said rods that are arranged at right angles to each other. The ends of each rod pass outward through opposite sides of said frame when after said rod is drawn taut they are fastened in any desired manner. The frame T has such width that when placed over the carriers O and O its side-bars will come over the same and by means of recesses $t'$, $t'$, &c., which are formed in the lower face of each of said side-bars and engage with the studs $o$, $o$, &c., of said carriers, said frame will be caused to move with the latter. If now the enamel sifting mechanism and the carriers are set in motion and a frame or tray, having in each of its holders a dial-base, is placed in position upon the front end of the carriers, such tray will be moved with the pre-determined speed beneath the falling enamel and each dial-base will be evenly covered with powdered enamel and each will have the same thickness of covering as have the other dial-bases. Such effect can only be secured when the conveying mechanism is free from jar and for such reason it is necessary that it should be isolated from the sifting mechanism and from all other sources of vibration. Such of the powdered enamel as does not lodge upon the dial-bases, passes through a hopper-shaped chute U in the table K, into a box V when it is received in a drawer $v$ at the bottom of the latter, and from time to time is returned to the sifting mechanism. A second drawer W is located beneath said table beneath and in front of the rear carrier wheels, for the purpose of catching such enamel as may fall upon the carriers and be dropped from the same as they pass downward around said wheels.

While two carrier bands are preferably employed for moving the dial-base trays beneath the sifting mechanism, one carrier, centrally located, will answer the purpose and may be employed, if desired. I preferably make the sifting mechanism stationary and move the dial bases horizontally beneath the same, but a reverse construction in which the dial-base supporting mechanism is stationary and the enamel sifting mechanism is adapted to move horizontally over the same, will perform the same office and in some instances may prove desirable.

Having thus described my invention, what I claim is—

1. As an improvement in apparatus for enameling dials, the combination of an enamel sifting or showering mechanism, a tray having holders for holding several dial bases, and means to move said tray beneath said mechanism to enable the bases to receive the falling enamel, substantially as and for the purpose shown.

2. As an improvement in the enameling of dials, an apparatus for applying powdered enamel to a dial base in which are combined an enamel sifting or showering mechanism, a sieve beneath the same through which enamel passes to a base, a dial base support, and means for moving the support horizontally beneath said sieve; substantially as and for the purpose set forth.

3. As an improvement in the enameling of dials, an apparatus for applying powdered enamel to a dial base in which are combined an enamel reservoir, two sieves, one of which is relatively movable or vibratory, and a support for a dial base or bases; substantially as and for the purpose shown.

4. As an improvement in the enameling of dials, an apparatus for applying powdered enamel to a dial base in which are combined an enamel reservoir discharging to a reciprocable or vibratory sieve, a stationary sieve beneath the latter, and a support for a dial base or bases, substantially as and for the purpose described.

5. In an apparatus for applying powdered enemel to a dial base, in combination, an enamel reservoir, a stationary sieve, a vibratory sieve of finer mesh than the latter and below the same, a dial-base support, and means for moving the latter beneath said vibratory sieve, substantially as and for the purpose set forth.

6. In an apparatus for applying powdered enamel to a dial base, in combination an enamel reservoir, a housing or base having a perforated top below said reservoir, a reciprocable or vibratory sieve in the housing below its top, a sieve below the latter sieve, and a support for a dial base or bases, substantially as and for the purpose specified.

7. As a means for showering powdered enamel, the combination of the hopper-shaped reservoir, the base or housing, the reciprocable or vibratory sieve, and the stationary sieve, substantially as and for the purpose shown.

8. As a means for showering powdered enamel, in combination, the hopper shaped reservoir, the supporting housing the upper and lower sieves, and the rod and crank connected to the upper sieve to reciprocate the same, substantially as and for the purpose described.

9. As a means for supporting dial-bases, the annular holders, the intersecting rods which pass through the lower portions of said holders, and the frame that receives the ends of such rods, substantially as and for the purpose set forth.

10. In combination with mechanism for sifting powdered enamel, the dial base tray having a number of annular holders and the endless band having studs to engage the tray, said band moving horizontally below the sifting mechanism, substantially as and for the purpose specified.

11. The combination of the supporting table, the transverse shafts and sprocket wheels, the endless bands provided with studs, and means whereby one of said shafts may be rotated at a uniform speed, substantially as and for the purpose shown.

12. In an apparatus for enameling dials in combination, an enamel reservoir, the sieves for sifting enamel therefrom, one of which is reciprocable or vibratory, and the mechanism for moving dial bases beneath the sieves, consisting of a suitably driven carrier and a base holding tray carried by the latter, substantially as and for the purpose described.

13. In an apparatus for applying powdered enamel in a dry state to dial bases, in combination, an enamel reservoir, sieves for discharging enamel from the latter in the form of a shower, a base-holding tray and a table for supporting such tray, mounted on a foundation out of contact with the reservoir and the sieves, substantially as and for the purpose set forth.

In testimony that I claim the foregoing I have hereunto set my hand this 6th day of June, A. D. 1890.

DAVID R. BUCHANAN.

Witnesses:
W. P. HEMMENS,
GEO. E. HUNTER.